May 6, 1952 J. PICANOL 2,595,367
TOROIDAL VARIABLE-SPEED GEAR DRIVE
Filed Sept. 23, 1947 7 Sheets-Sheet 1

Jaime Picanol
INVENTOR
PER Robie & Bastien
ATTORNEYS

May 6, 1952  J. PICANOL  2,595,367
TOROIDAL VARIABLE-SPEED GEAR DRIVE
Filed Sept. 23, 1947  7 Sheets-Sheet 2

Jaime Picanol
INVENTOR
PER
ATTORNEYS

May 6, 1952 J. PICANOL 2,595,367
TOROIDAL VARIABLE-SPEED GEAR DRIVE
Filed Sept. 23, 1947 7 Sheets-Sheet 4
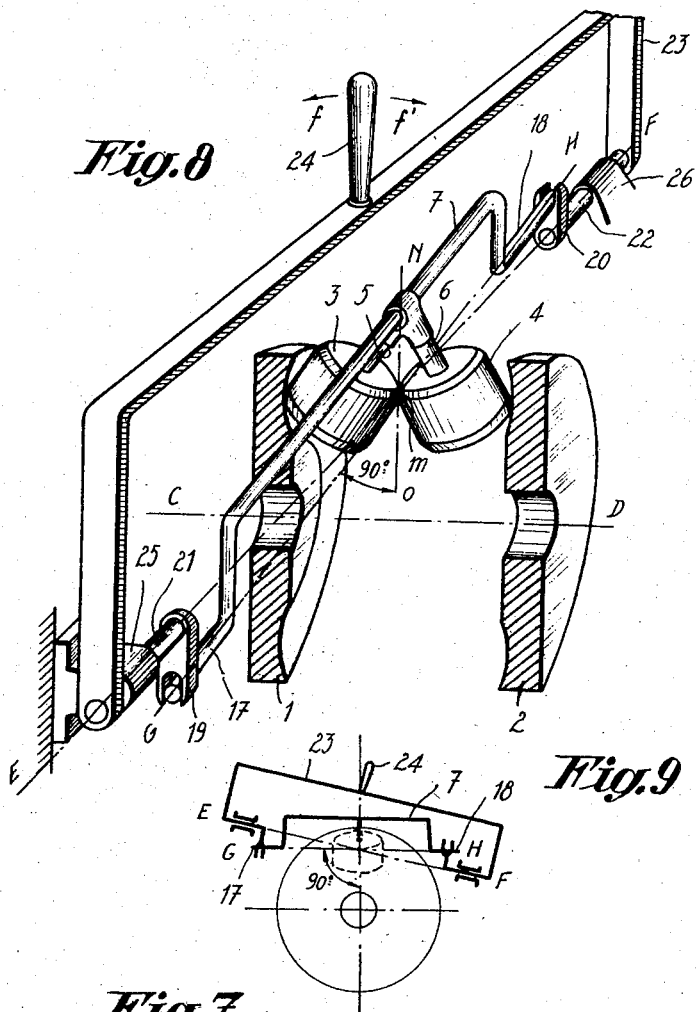
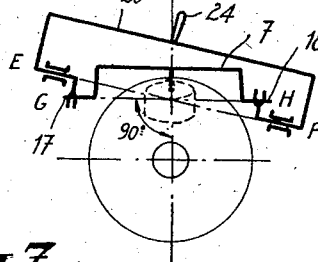
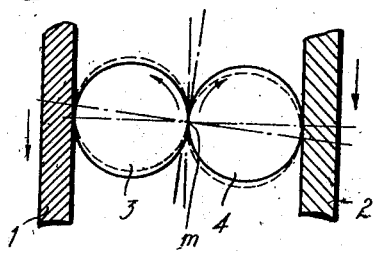
Jaime Picanol
INVENTOR
PER
ATTORNEYS May 6, 1952

J. PICANOL 2,595,367

TOROIDAL VARIABLE-SPEED GEAR DRIVE

Filed Sept. 23, 1947

Jaime Picanol
INVENTOR
PER Robie T. Bastian
ATTORNEYS

May 6, 1952 J. PICANOL 2,595,367
TOROIDAL VARIABLE-SPEED GEAR DRIVE
Filed Sept. 23, 1947 7 Sheets-Sheet 6

Jaime Picanol
INVENTOR
PER *Robert Bastien*
ATTORNEYS

May 6, 1952  J. PICANOL  2,595,367
TOROIDAL VARIABLE-SPEED GEAR DRIVE
Filed Sept. 23, 1947  7 Sheets-Sheet 7

Jaime Picanol
INVENTOR
PER. Dobie & Bastien
ATTORNEYS

Patented May 6, 1952

2,595,367

UNITED STATES PATENT OFFICE 2,595,367

TOROIDAL VARIABLE-SPEED GEAR DRIVE

Jaime Picanol, Ypres, Belgium

Application September 23, 1947, Serial No. 775,735
In Belgium November 9, 1943

Section 1, Public Law 690, August 8, 1946
Patent expires November 9, 1963

9 Claims. (Cl. 74—200)

The present invention relates to a toroidal variable speed gear drive in which one or more pairs of rollers are interposed between a driving disc and a driven disc, the speed ratio of which depends upon the position of the point of contact between said rollers and their respective disc.

The main object of the invention is the special arrangement of the driving-rollers and of their supports from which depend principally the efficiency and the durability of the device.

It is not sufficient that the second disc be driven by the first one and in the same direction of rotation, the specific pressures must also be acceptable and the relative movements between the two rollers of each pair and between the rollers and their respective discs must practically be perfect rolling movements, that is to say, without dangerous slipping components; also one must avoid that the spread of the contacting surfaces be theoretically reduced to a point (punctual contact).

In order to obtain these results which cannot be provided by known devices, the driving rollers considered together or individually, present the following characteristics which are introduced for the first time in this kind of toroidal variable speed gear drive.

(a) The axes of the two rollers of each pair must be concurrent.

(b) The concurrent axes of the rollers of each pair are situated in a plane passing through the rotation axis of driving and of the driven disc.

(c) Each roller presents a conical surface on which it rolls on the other roller and a toroidal surface on which it rolls on the disc with which it is in contact.

(d) The theoretical contact of the two rollers is a straight line; the theoretical lines of contact of the rollers and their respective discs are curves with a predetermined profile; the respective centre points of said curves are in line with the centre point of the said straight contact line of the rollers; this straight contact line is perpendicular to said straight centre point line and finally, the reaction of the thrust-efforts between the rollers and their discs is effected according to the direction of said centre-point line.

These essential characteristics are shown in the appended drawings in which:

Figures 3 to 7 show diagrammatically a non-reversible variable speed drive;

Figures 8 and 9 show a reversible variable speed drive;

Figure 1:
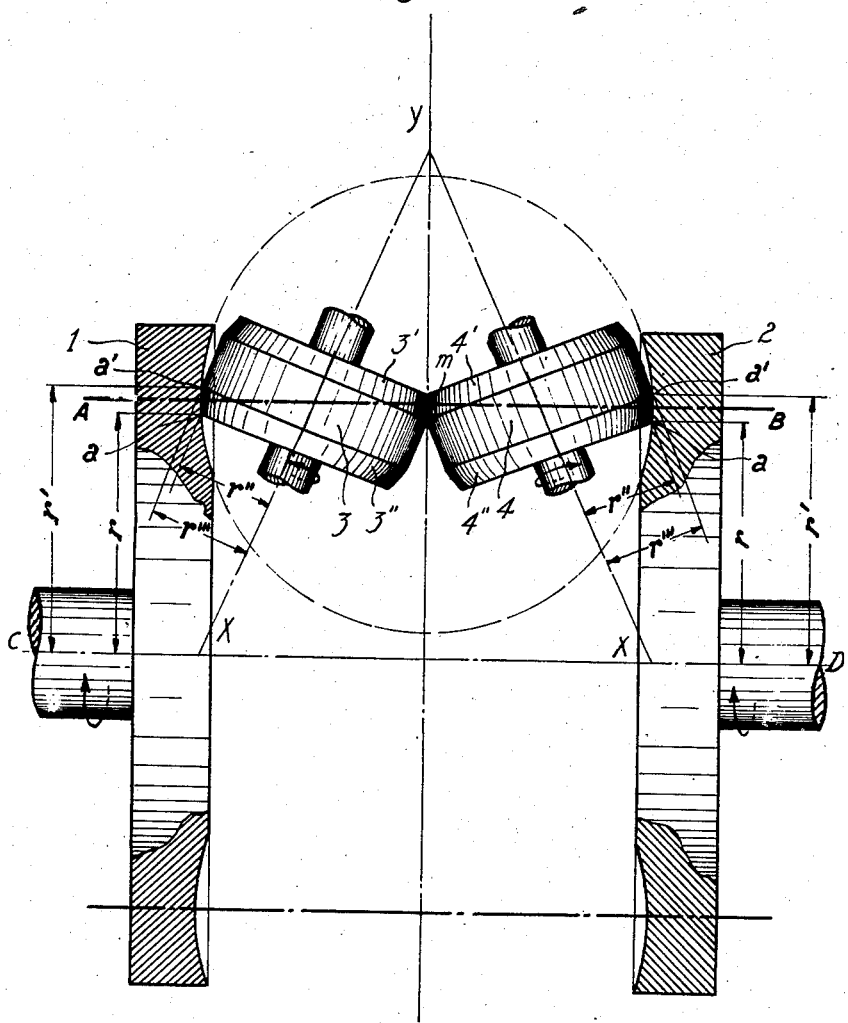
Figure 1 is a schematic elevation, partly in section, of the device according to the invention, in normal position.
Figure 2:
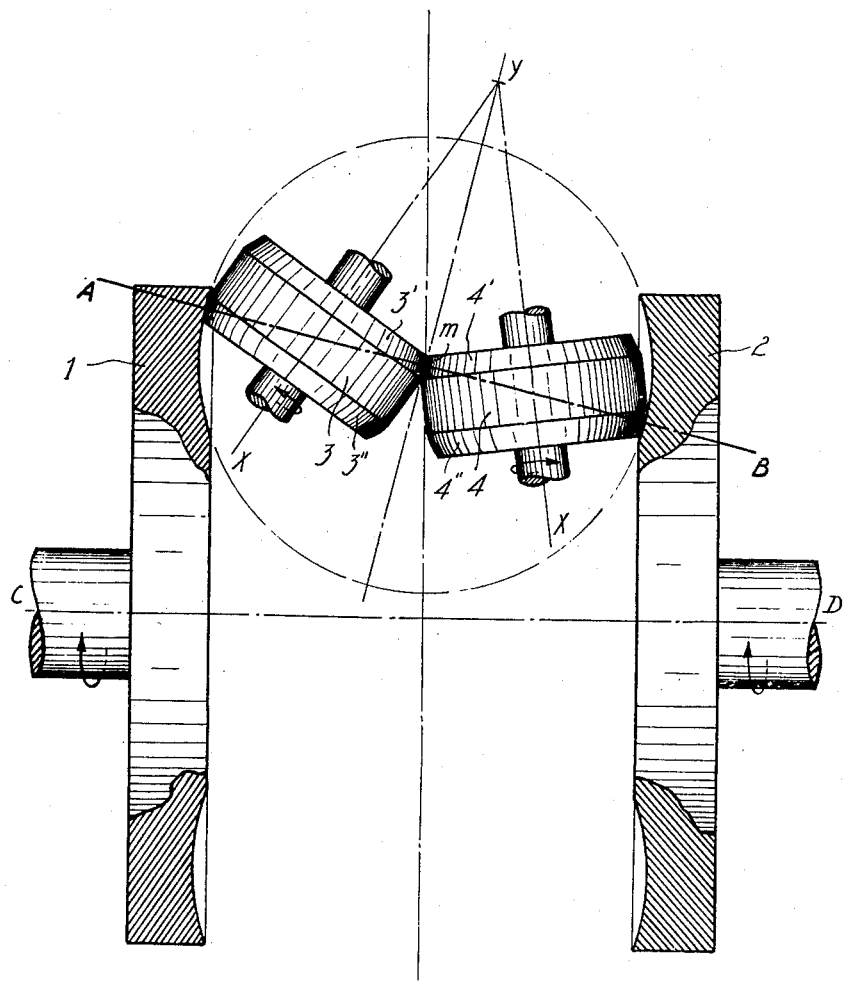
Figure 2 is a view similar to that of Figure 1, showing the device in another position.
Figure 3:
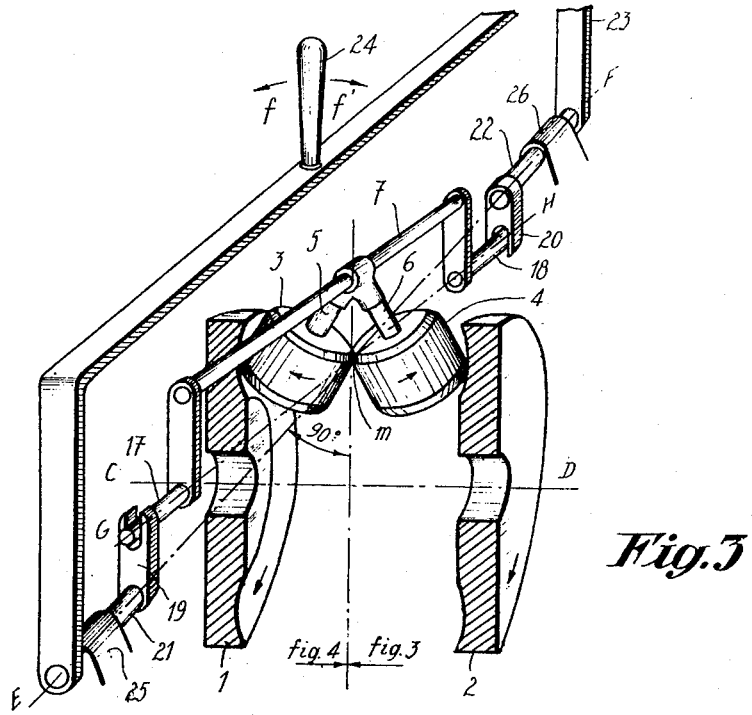
Figure 4:
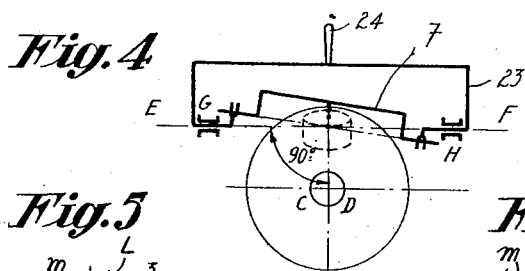

For the clearness of the explanation, Figures 1 and 2 represent schematically a device with only one pair of rollers 3—4. These two rollers are in contact with each other, and on the other side, the roller 3 is in contact with the driving disc 1, whilst at the same time, the roller 4 is in contact with the driven disc 2. The three points of contact, or more exactly the centre-point of these three contact lines or contact surfaces, are disposed on the same staright line A—B.

The contact between the two rollers 3—4 is effectuated by the conical surfaces 3'—4' whilst the contact between the rollers and their respective toroidal disc is effectuated by a toroidal surface, respectively 3''—4'' of a suitable curved profile. It is to be remarked that the limiting points $a$—$a'$ of the line or surface of contact between the roller and its toroidal disc have different respective distances $r$—$r'$ from the rotation axis of said toroidal disc. On the other hand, the same limiting points $a$—$a'$ are also at unequal distances from the rotation axis X—Y of each roller, these distances being respectively $r''$—$r'''$.

As the ratios $r/r''$ and $r'/r'''$ are practically identical, there will be little slipping effect between the roller and the disc which it contacts. Nevertheless small differences exist between these ratios for certain positions of the rollers; however these differences will always be acceptable in practice and by all means always inferior to those of the known devices.

In this particular embodiment, the rollers are contacting each other along a theoretical line the centre point of which is indicated by $m$, which line remains always perpendicular to the line A—B passing through the centre-points of the contact lines of the two rollers and of each roller and its corresponding disc. The axes X—Y respectively of the two rollers of each pair are always intersecting or concurrent and are always situated in a plane containing the common axis C—D of the driving and the driven discs.

To change the speed-ratio, it is sufficient to change the position of the points of contact of the rollers and the discs.

For this purpose, the pairs of rollers are mounted in movable supports. These supports are generally mechanically connected to each other, so that the displacements communicated to one of them are faithfully and simultaneously reproduced by the others. Due to the relatively considerable pressures transmitted at the points of contact of the rollers of a same pair and the rollers and their respective discs, it is not safe to act directly, that is to say, to displace the rollers of a same pair so that their axes remain always in the same initial plane. Practice shows that it is important to make these displacements possible with a minimum effort and a maximum faithfulness. It is also important to ensure these displacements without introducing a slipping effort between the movable contacting parts. More particularly, it is essential that the two rollers in each pair always continue to roll perfectly one on the other without slipping.

According to the invention, and generally speaking, it is necessary, and sufficient for changing the speed ratio, that the movable supports of each pair of rollers be constructed in such a way that, upon their displacement, the plane containing the axes of the two rollers be rotated about the centre point of the straight contact line of the two rollers. It is also necessary that the axes of the rollers remain always concurrent. The rotation of said plane is such that one of the roller axis becomes offset on one side of the rotation axis of the discs and that the axis of the second roller of the pair becomes offset on the other side of the same axis of the discs.

Thus the plane containing the axes of the rollers of a pair can be rotated in any direction, in so far that finally one of the axes of the pair of rollers be offset on one side and the second on the other side of the axis of the discs. In a specific embodiment, this plane will rotate about the straight line of contact of the two rollers of the pair; in another specific embodiment, it will rotate about the centre-point of the straight line of contact of the two rollers in such a way that this straight line, contained in the said plane, will generate a cone which apex is the said centre-point. Other specific embodiments can be considered.

Generally, it will suffice that the movable supports of the roller-pairs be able upon a change of the speed-ratio to revolve about two distinctive axes, one of which will be passing through the centre point of the straight line of contact of the rollers of a pair and the other will be perpendicular to said straight line of contact.

These two axes will be those, generally speaking, of distinctive parts which will constitute the movable support itself; one of said axes pertaining for instance to a support member supporting directly the axles of the rollers of the pair, the other axis pertaining, for instance to a control element having fulcrum pins, which will constitute the axis of said support member, and which will be supported in suitable bearings. By orientating adequately these two axes of the movable support member, a non-reversible or a reversible device can be obtained. Indeed such a device with a reversible rotation direction can be had by the simple expedient of making these two rotation axes pass through the centre point of the straight line of contact of the two rollers of the pair, and seeing to it that the rotation axis of the support member is perpendicular to this straight line of contact. Just as easily, and practically with the same components, a device with a non-reversible rotation direction will be provided by making the two said rotation axes pass through the centre-point of the contact line of the rollers, but such that the rotation axis of the control element remains always perpendicular to the said straight line of contact.

Other arrangements of these two rotation axes can be considered which would fulfill the conditions applying to the present invention.

For instance another reversible variable speed drive will be obtained when making one of the two rotation axes of the movable support member of the rollers pass through the centre-point of the straight line of contact of the latter, and on which straight line it is perpendicular, the other rotation axis intersecting the rotation axis of the discs.

In all these drives, the axes of the rollers in each pair are always intersecting so that, whatever the movements of the rollers may be, the latter always roll perfectly on each other according to a straight contact line. It could equally be feasible to have the ratio changed by displacing the axes of the two rollers the one with regard to the other in each pair so as to make them offset. However, this method should be rejected, because the rollers, although rolling on each other, would show prejudicious slipping.

According to the Figures 3 to 7 in which, for the clearness of the explanation, only one pair of rollers has been represented, the rollers 3—4 of the considered pair are disposed between the discs 1—2, respectively the driving and the driven discs. The respective axes 5—6 of said rollers are secured to a support member 7 which, in this case, has the shape of a crank-shaft; the axis G—H of the crank pins 17—18 goes through the point m—which is the centre of the straight line of contact of the rollers. This axis G—H is inclined relative to the plane containing the axes 5—6 of the rollers and the common axis C—D of the discs 1—2. Said crankpins 17—18 are resting respectively in the fork-shaped cranks 19—20 which, by means of the pins 21—22, are mounted on a control element 23 provided with an operating lever 24. The pins 21—22 rest in bushings, respectively 25—26, placed in mutual prolongation and from which the common axis E—F passes through the point m, and is perpendicular to the straight line of contact of the rollers, and consequently to the plane containing the axes 5—6.

If for instance, for the better understanding of the operation of ths variable speed drive, we imagine the pins 17—18 firmly attached to their respective cranks 19—20 and if we displace the lever 24 for example, in the direction of the arrow f, we will have in this case a direct drive. Indeed, the axes 5—6 of the rollers are rotated about point m by the rotation of the pins 21—22 which rotate in their bushings 25—26, the axis E—F of the same going through the point m. Finally, as the axis E—F is perpendicular to the plane containing the line of contact of the two rollers and the axis C—D, the axes 5—6 of the rollers will displace themselves and be maintained in an initial plane containing the axis C—D of the discs. In this case we thus really have a direct drive. However, when moving the lever 24 and simultaneously the control element 23, the pins 17 and 18 will slightly rotate in the fork-shaped part of their respective cranks 19—20, due to the considerable pressure prevailing at the points of contact between the rollers and their respective discs; thus the support member 7, strained in opposite direction at both its extremities by the cranks 19—20, will be inclined with regard to the plane containing the driving axis C—D and the line of contact of the two rollers and the intersecting axes 5—6 of the rollers. During this movement, the support member 7 will force the rollers to rotate about point $m$. Ipso facto these axes of the rollers are placed in offset position with regard to the axis C—D of the discs at an equal distance, but on each side of the above named plane containing said axis.

Figures 5, 6:
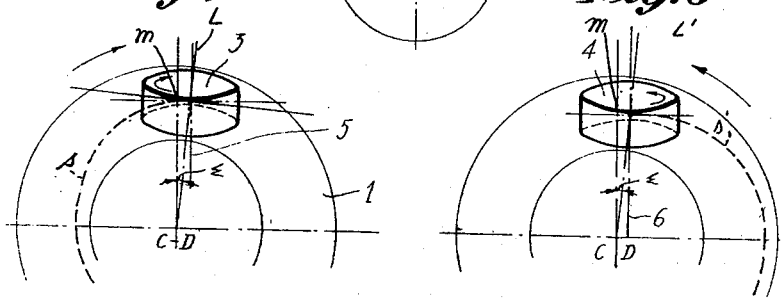
Figure 10:
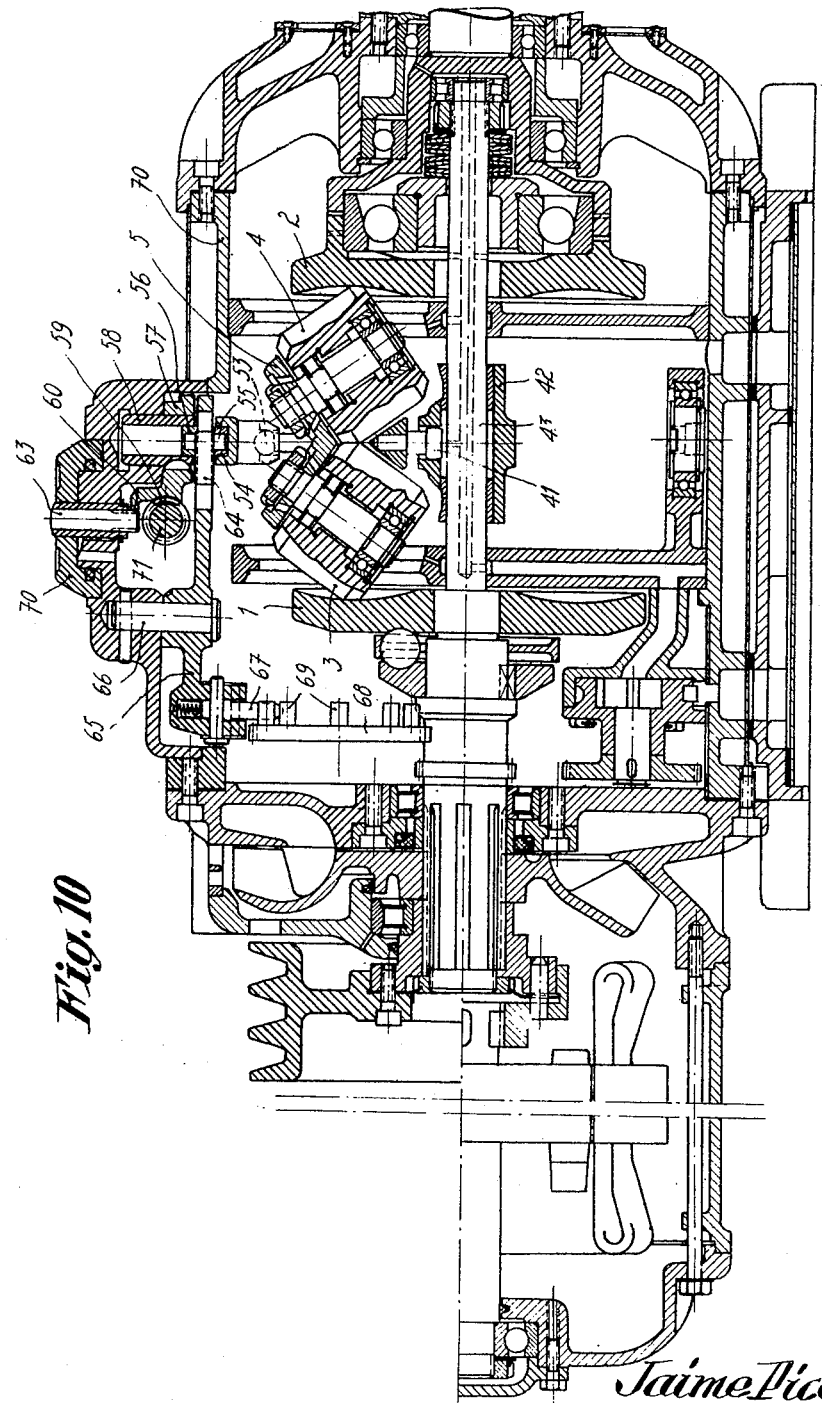
Figures 10 and 11 are a longitudinal and cross-section respectively of a practical arrangement of a device more particularly applicable to continuous spinning and twisting machines.
Figure 11:
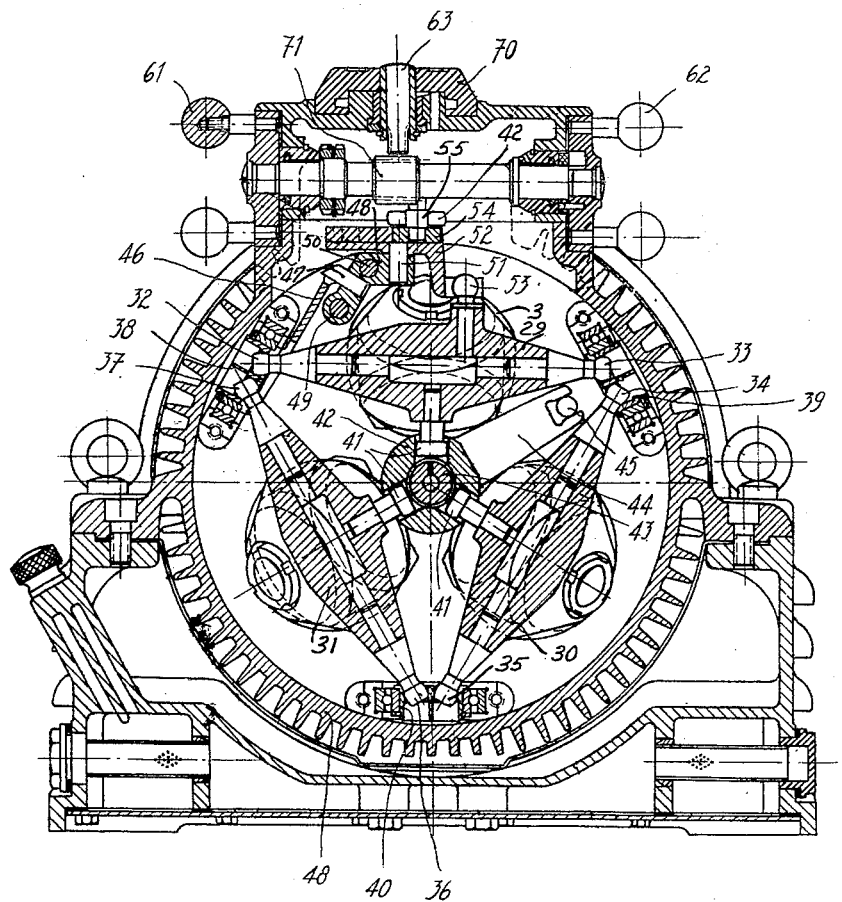

As particularly shown in the Figures 5 and 6, one of the rollers, roller 3 for example, is placed in such a way that the axis 5 presents an offset measured by the angle $\Sigma$ defined by the intersection of the line L joining the centre of the roller 3 to the axis C—D with the plane containing said axis C—D and the contact line of rollers 3 and 4, said contact line being indicated by its centre point $m$. Thus with regard to the rotation direction of the disc 1 and the roller 3, the latter will be displaced relatively to the disc 1, along a spiroidal track $s$ progressively approaching the axis C—D of the discs. As to the second roller 4 of the same pair, its axis 6 will equally be put according to the considered criterions—in a previous state of offset and of a same angle value $\Sigma$. However, according to the rotation direction of the disc 2 and its roller, the latter will displace itself relative to the said disc 2, as per an ascending spiroidal track $s'$ that is to say, going away from the axis C—D of the rollers as shown in Figure 6. The result of this kinematic combination will be that, through an angular displacement of the lever 24, the rollers of each pair, although their axes are still intersecting, are put in a previous offset position on both sides of the axis C—D of the discs. This operation requires only a small effort. Due to this offset, one of the rollers displaces itself away from the axis C—D whilst the other roller is approaching it with a same quantity, and the same effort is going on as long as the offset exists between the axes 5—6 and the axis C—D of the discs. To stop these radial movements of the rollers, it suffices to eliminate the angle between the plane of the support member 7 and the plane containing the control member 23; this automatically takes place when the speed ratio corresponding to the position of the control element 23 is obtained; indeed, during their movements of approaching and regressing with regard to the axis C—D, the rollers will finally have turned around the point $m$, carrying in their movement the support member 7 that will finally place itself in alignment with the control element 23 in such a way that their planes will perfectly coincide as in their initial position, thus the initial angle between the members 7 and 23 will be reduced automatically and progressively to zero. This last point determines the non-reversibility of the whole device, for if the direction of rotation of the variable speed gear drive is changed, it will be found that when having a preliminary offset it will not be possible to cancel it automatically, on the contrary the offset will increase progressively and will finally destroy the variable speed gear. This kind of arrangement will thus only be acceptable for a well determined direction of rotation.

On the other hand the reaction efforts of the resisting couple will indirectly be carried by said axis E—F of the control element through the medium of the axis G—H of the support member 7 and of the cranks 19 and 20.

Owing to this, the control element will be stressed and this stress will be proportional to the resisting couple of the kinematic system. Hence, if the control element is bearing for instance against a suitable elastic element, the said control element may change its position according to the fluctuations of the reaction efforts, e. g. of the couple resisting to the driving disc. Consequently, a device will be obtained in which the position of the rollers, and the speed-ratio will directly and permanently be controlled by the resisting couple of the driven shaft. Thus a variable speed reducer with automatic control is obtained.

In order to avoid the inconvenience of the non-reversibility of the speed drive, the same may be made reversible as shown in Figures 8 and 9.

In this embodiment the rollers 3 and 4 are disposed between the discs 1 and 2, respectively the driving and the driven disc, and are rotatably secured to a support member 7, the ends 17 and 18 of which have a common axis G—H going through the point $m$ and perpendicular to a plane containing the axes 5—6 of the rollers and axis C—D of the discs. These ends 17—18 are engaged in a fork-shaped part of the respective cranks 19—20 opposed one to the other and each ending in a pin respectively 21—22 of the common control element 23 to which is secured the lever 24. The pins 21 and 22 are resting into two fixed bushings 25—26 of which the common axis E—F goes through the point $m$ and is inclined with regard to the plane mentioned before viz. the plane containing the axes 5—6 of the rollers and the axis C—D of the discs.

At the intervention of the kinematic system, if the lever 24 is rotated a certain angle, due to the considerable pressure existing at the points of contact between the rollers and their respective discs and to the special position of the axes E—F and G—H, the axes 5—6 of the rollers are caused to rotate about an axis O—N which merges with the line of contact of the two rollers, as it passes through the point $m$ and through the intersection point of said axes 5 and 6.

Owing to this fact the rollers are placed in offset position with regard to the axis C—D of the discs, of a same amplitude but on each side of said axis.

Just as in the preceding case, this preliminary state of offset will finally cause a rotation of the two rollers around a point $m$ and thus effect a changing of the speed ratio.

To cancel the offset of the rollers it will suffice in this case to put again, by any kinematic way, the control element in its initial position.

It is also possible to design the device so as to satisfy all the other conditions which will principally depend on the relative position of the rotation axes of the rollers and the supports of said rollers around the point $m$. The practical embodying of these drives presents no difficulties.

As an example, a preferred embodiment of a reversible variable speed drive is illustrated in the Figures 10 to 15 in which the apparatus has three pairs of rollers 3 and 4 with intersecting axes, interposed between the driving disc 1 and the driven disc 2 both having a toroidal contact surface.

Each of three pairs of rollers 3—4 is secured to its respective support member, 29—30 and 31. Each support member has at both ends a spherical pin, respectively 32—33, 34—35 and 36—37; the common axis G—E of these pins passes through the centre-point *m* of the contact line of the rollers and is perpendicular to said contact line.

These three members are disposed in triangle in such a way that the pins 37—32, 33—34, and 35—36 are forming the apices of this equilateral triangle and are resting two by two in bushings 38—39 and 40 mounted on ball-bearings and in which are made two cylindrical holes, symmetrically situated on both sides of the rotation axis of these bushings.

Each of these support members 29, 30 and 31 has at its lower part a spherical pivot 41 which is resting in a cylindrical hole made radially in a central bushing 42 capable of sliding axially on the axis 43 of the driving disc, each rotation movement of this bushing 42 is stopped by a fork 44 secured to this bushing and engaged by a shaft 45 mounted on the carter parallel to the axis of the bushing 42.

The bushing 38 is secured to a crank 46 whose crankpin 47 is driven by a slide 48, guided in its transversal displacements by two parallel shafts 49 and 50.

This slide 48 is supporting the pivot 51 of a beam 52, one of its arms ending in a fork and being driven by a spherical pivot 53 which is secured to the support member 29. This beam 52 is provided at its upper part with a longitudinal slit inside which the nut 54 can slide and in which comes to rest a pin 55 which, at its other end, is carrying another nut 56 capable of sliding in a second slit superposed to the first one and integral with a lever 57; the latter can rotate through its embossment 58 in a bore made in the carter, and is provided with two toothed sectors, respectively 56 and 60, the first one intermeshing with a worm 71 actuated by the handles 61 and 62 and the other toothed sector intermeshing with a pinion secured to the axis 63 of the dial of the speed ratio.

The crankpin 55 has also a slide 64, imprisoned in the groove of a second beam 65. This beam 65 can swivel around an axis 66 secured to the carter, and carries at its other extremity a pin 67 which is thrusted back in one direction or another by a drum 68 with tap-roots 69.

All these mechanisms are enclosed in a tight carter 70 having an oil-bath, a pump and a lubrication system under pressure. Supporting elements, such as ball bearings, thrust bearings, etc. are also enclosed in the carter 70.

This variable speed gear drive, as per the drawings, can be driven by a pulley with multiple belts, or directly through a coupling device by an electric motor, or by any other means.

*Function*

The movable components of this device being supposed to be well balanced, we communicate to the crank 46 a slight angular displacement in one direction or another. By this operation the pins 32 and 37 pertaining respectively to the support members 29 and 31 will have made a rotation around the axis of the bushing 38 which causes the two support members 29 and 31 to be rotated about the line of contact of their respective rollers. This rotation will force the pins 33 and 36 respectively of the support members 31 and 29 to communicate a rotation about their axes to their respective bushings 40 and 39, similar to those effectuated by the bushing 38; consequently the pins 35 and 34 being thrusted on both sides by their respective bushings, will involve the third support members 30 which will then effectuate a similar rotation.

The effect of the synchronized rotation of these three support members will be that the axes of their rollers will be put into offset with regard to the axis of the toroidal discs. As seen previously, the rollers will, under the influence of this offset and with regard to their rotation direction, lose their balance and effectuate, together with their support member, a rotation about an axis which goes through the point *m* (*m* being the centre point of contact of the rollers) and which is perpendicular to the plane formed by the axes of these rollers. Upon this rotation, the points of contact of the said discs and the rollers of each pair will approach or move away from the axis of the toroidal discs.

It is in this manner that the speed-ratio varies and this variation will subsist as long as the offset will be maintained.

To stop the rotation of the support members and restore the balance of the systems once the desired ratio is obtained, it will be sufficient to cancel the offset, namely to put the crank 46 again in its initial position.

In order to cancel automatically the offset of the rollers, each time the desired speed ratio is obtained the crank 46 is displaced indirectly by the intermediary of the slide 48 to which is communicated a straight transversal displacement by giving to the beam 52 an angular displacement around the pin 53 (momentarily stationary). This last displacement is obtained by the angular displacement of the lever 57 whose axis of rotation is coinciding with the axis of the pivot 51 (when the slide 48 is in its initial position) which will involve the beam 52 through the intermediary of pin 55 and the nuts 56 and 54. The transmission ratio of all these elements is so calculated that during the variation of the speed ratio, the pin 53 of the member 29 will follow it into its displacements and involve the fork of the beam 52 which will make this beam effectuate a rotation about the pin 55 which as this moment is stationary. This rotation of the beam will communicate to the slide a displacement in the direction of its initial position, which will be effected at the same time as the desired speed ratio.

Figure 12:
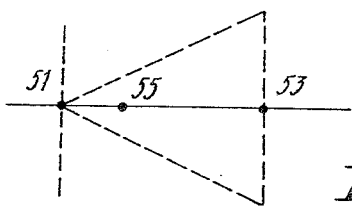
Figures 12 to 15 are diagrams illustrating the characteristic positions of the controlling parts of the apparatus shown in Figures 10 and 11.
Figure 13:
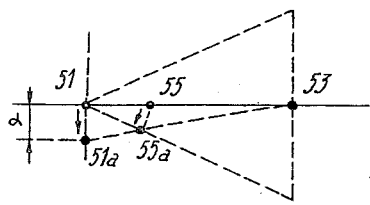
Figure 14:
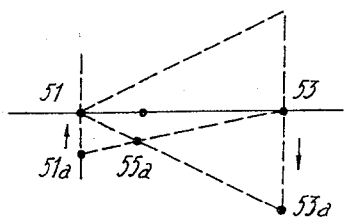

The Figures 12, 13 and 14 show schematically the different phases which are characterizing a variation of the pins 51, 55 and 53 when the speed ratio is equal to 1/1.

The Figure 13 shows that we have communicated to the pin 55 a rotation about the axis of pin 51 which has forced the beam 52 to effectuate a rotation about the axis of the pin 53 in such a way that the slide 48 has moved until the pin 51 has reached 51*a*. At this moment the offset causes the support members to turn and the pin 53 displaces itself in the direction indicated by the arrow (Figure 14) and due to this, it involves the beam 52 that will rotate about the axis 48 towards its initial position which will be reached when the pin 53 arrives in 53*a* and the pin 51*a* arrives again in 51.

In this way, the offset is cancelling itself automatically as soon as the desired speed ratio has been obtained.

Figure 15:
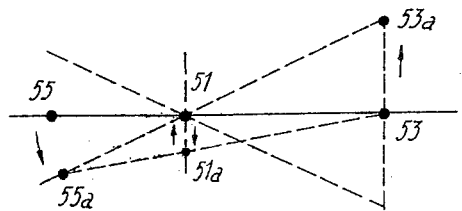

As we know the rotation direction of the support members when changing the ratio, depends amongst others, upon the rotation direction of the variable speed drive; consequently, if we consider the Figure 12 and suppose that we make the variable speed drive rotate in opposite direction, the pin 53 instead of moving downwards, will be displaced upwards (Figure 15); consequently, to bring the slide 48 together with the pin 51 in initial position, we shall have to bring the pin 55 on the other side of the pin 51 as indicated (Figure 15).

These two different positions of the pin 55 according to the rotation direction of the drive are mechanically effected as follows:

The drum 68 with projecting studs 69 is driven by a set of gears which communicate to it a slow rotational movement. The projecting studs are thrusting back the beam 65 by the intermediary of an elastic pin 67. According to the rotation direction, this beam 65 will be deviated in one direction or the other and move the pin 55 through the medium of the slide 64, until it comes to place itself on one side or the other of the pin 51 and thus fulfill the necessary conditions independently of the rotation direction of the variable speed drive. The system is thus reversible.

This apparatus will evidently be completed by all the elements and accessories according to the application of usual engineering norms.

I claim:

1. A toroidal variable speed gear drive comprising a driving and a driven disc having a common axis, a plurality of pairs of contacting rollers interposed between said discs, the roller axes intersecting each other, each of the rollers having a conical surface by which it contacts the other roller of the pair and a second rolling surface by which each roller contacts the toroidal surface of the corresponding disc, and a movable support on which each pair of rollers is rotatably mounted, the angular displacement of said support causing a displacement of the point of contact of said rollers with their corresponding disc thereby effecting a change in the speed ratio of said discs.

2. A toroidal variable speed gear drive as claimed in claim 1, wherein the roller axes of each pair of rollers are in a plane containing said common axis of said discs.

3. A toroidal variable speed gear drive as claimed in claim 2, wherein the centre point of the rollers mutual contacting line and the middle points of the contacting line of the rollers with the discs lie in a straight line which is always perpendicular to the contacting line between the rollers.

4. A toroidal variable speed gear drive as claimed in claim 3, means on said support to displace the two rollers of each pair simultaneously, whereby the plane defined by the roller axes revolves around the middle point of the straight theoretical contact line between the rollers during the movement preceding a change in the speed ratio.

5. A toroidal variable speed gear drive as claimed in claim 4 wherein a control member is pivotally mounted at both ends and is rotatable about a first axis, said support member pivotally connected at the two spaced points to said control member and actuated thereby, said pivot connection lying along a second axis, at least one of said axes passing through the middle point of the theoretical contact line of the two rollers and at least one of said axes being perpendicular to said contact line.

6. A toroidal variable speed gear drive as claimed in claim 5, wherein said two axes pass through the middle point of the theoretical contact line of the two rollers, said first axis being perpendicular to said contact line and said second axis being inclined to the same, whereby said drive is made non-reversible.

7. A toroidal variable speed gear drive as claimed in claim 5, wherein said two axes pass through the middle point of theoretical contact line of the two rollers, said second axis being perpendicular to said contact line and said first axis is inclined relatively thereto, whereby said drive is made reversible.

8. A toroidal variable speed drive as claimed in claim 5, wherein only one of said axes passes through the middle point of said contact line, and is perpendicular thereto, while the other axis merges with said contact line.

9. A toroidal variable speed gear drive as claimed in claim 5 wherein three pairs of rollers are provided and wherein said second axes for said pairs form the sides of an equilateral triangle.

JAIME PICANOL.

REFERENCES CITED

The following references are of record in the file of this patent:

FOREIGN PATENTS

| Number | Country | Date |
| --- | --- | --- |
| 796,188 | France | Jan. 17, 1936 |